H. T. BUTLER.
ANIMAL TRAP.
APPLICATION FILED SEPT. 16, 1911.
1,016,671.
Patented Feb. 6, 1912.
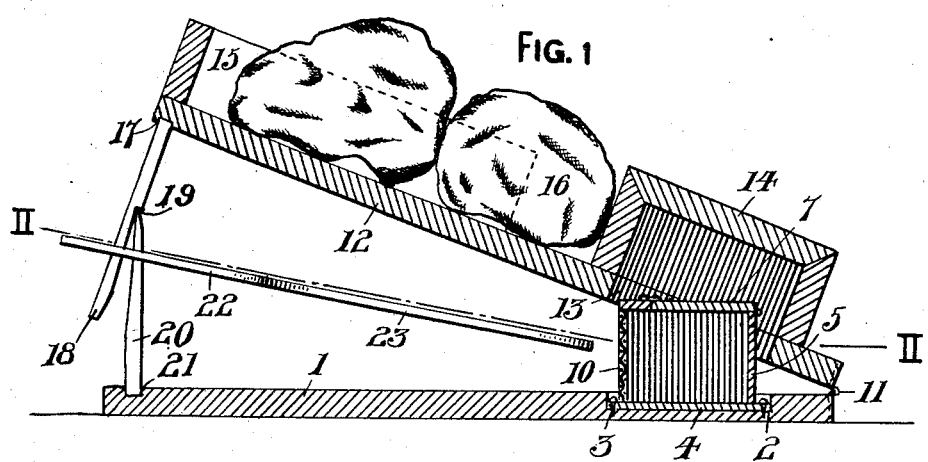
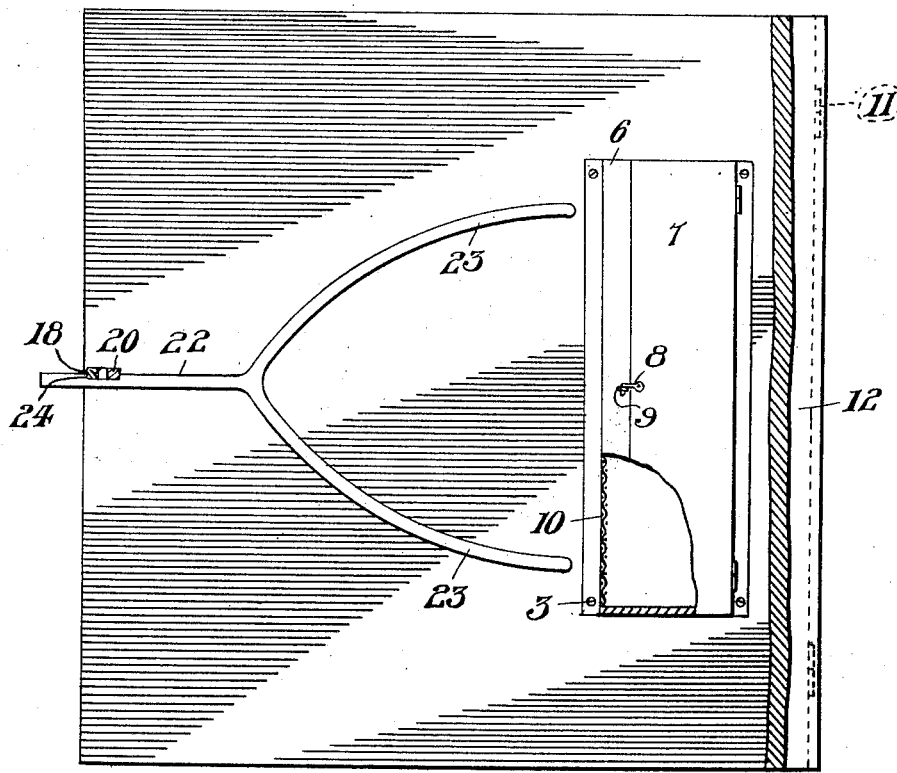
WITNESSES
INVENTOR
Harry T. Butler
BY
ATTORNEYS

UNITED STATES PATENT OFFICE.

HARRY T. BUTLER, OF BUTLER, PENNSYLVANIA.

ANIMAL-TRAP.

1,016,671.  Specification of Letters Patent.  Patented Feb. 6, 1912.

Application filed September 16, 1911. Serial No. 649,642.

*To all whom it may concern:*

Be it known that I, HARRY T. BUTLER, a citizen of the United States of America, residing at Butler, in the county of Butler and State of Pennsylvania, have invented certain new and useful Improvements in Animal-Traps, of which the following is a specification, reference being had therein to the accompanying drawing.

This invention relates to animal traps especially designed for entrapping large fur-bearing animals.

The primary object of my invention is to provide a trap that can be located under brush, branches or other matter and thereby concealed to such an extent that an animal is enticed to the trap by a live bait, caught in the trap and firmly held until released.

Another object of this invention is to provide a simple and durable trap that is positive in its action, not liable to injury by ordinary use and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a longitudinal sectional view of the trap, and Fig. 2 is a horizontal sectional view of the same taken on the line II—II of Fig. 1.

A trap in accordance with this invention comprises a base board 1, preferably rectangular in plan, and this board, contiguous to the rear edge thereof, is provided with a rectangular recess 2. Secured to the bottom of the recess 2 by nails or other fastening means 3 is the bottom plate 4 of a box or cage 5. The top plate 6 of the box or cage has a hinged door 7 normally maintained in a closed position by a hook 8 and a staple 9. The box is rectangular and the door 7 corresponds in length to said box, whereby bait, preferably alive, can be easily placed within the box or cage. The front of the box or cage is closed by a screen or bars 10, whereby the bait will be exposed toward the front edge of the base board 1.

Hinged or otherwise connected to the rear edge of the base board 1, as at 11, is a trap board 12, preferably the same size as the base board 1. This trap board has a rectangular opening 13 providing clearance for the bait box or cage, and the top of said opening is closed by a rectangular housing 14, which incloses the bait box or cage, when the trap board 12 is lowered. The front and side edges of the trap board 12 are provided with walls 15 coöperating with the front wall of the housing 14 in providing a holder for weights 16. Stones are preferably used for this purpose. The trap board 12 at the forward edge thereof, has a small recess 17 for a prop 18 and said prop has a notch 19 to receive the upper end of a pin 20. The lower end of the pin or prop 20 is loosely mounted in a recess 21 provided therefor in the upper side of the base board 1 at the forward edge thereof. The prop 18 and the pin 20 are held in position, with the trap board 12 elevated by the stem 22 of a fork 23. The stem 22 has the side wall thereof provided with a slot 24 and the end walls of this slot engage the prop 18 and the pin 20 and retain said prop and pin in position, with the fork 23 balanced between the base board 1 and the trap board 12. An animal attempting to reach the bait within the box or cage contacts with the fork 23 and when this fork is moved, the prop 18 and the pin 20 are dislodged and the trap board 12 immediately falls upon the animal and pins the animal until released by the trap board 12 being elevated.

It is apparent from the foregoing that the trap can be surrounded by a stone pile that will represent the haunts of certain animals, and that when properly adjusted it is impossible for an animal to detect the nature of the trap.

What I claim is:—

An animal trap comprising a base board having a centrally disposed recess in its upper face near its rear edge, a live bait cage secured in said recess and projecting upon the top of the board, a trap board of the same area as the base board, said trap board hinged to the rear edge of the base board and arranged over the latter, said trap board provided with a centrally disposed opening near its rear edge, a closed housing carried by and registering with the opening provided in said trap board and capable of inclosing said bait cage when the trap board is lowered, means carried by the forward portion of the trap board to constitute a receptacle adapted to contain weights, a prop attached to the forward edge of the base board and inclining outwardly therefrom, an outwardly inclined pin projecting from the forward edge of said trap board, said pin engaging said prop to maintain the trap board elevated at an inclination with respect to the base board, and a shiftable fork interposed between said boards and provided with a slot having the end walls thereof engaging with said pin and prop and constituting means when shifted by an animal for separating the pin and the prop whereby the trap board is lowered upon the base board.

In testimony whereof I affix my signature in the presence of two witnesses.

HARRY T. BUTLER.

Witnesses:
MAX H. SROLOVITZ,
CHRISTINA T. HOOD.

Copies of this patent may be obtained for five cents each, by addressing the "Commissioner of Patents, Washington, D. C."